(12) United States Patent
Bortoli et al.

(10) Patent No.: US 9,976,579 B2
(45) Date of Patent: May 22, 2018

(54) RAM AIR TURBINE ACTUATOR SYSTEM

(71) Applicant: Hamilton Sundstrand Corporation, Charlotte, NC (US)

(72) Inventors: Stephen Michael Bortoli, Roscoe, IL (US); William E. Seidel, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 78 days.

(21) Appl. No.: 15/067,853

(22) Filed: Mar. 11, 2016

(65) Prior Publication Data

US 2017/0261017 A1    Sep. 14, 2017

(51) Int. Cl.
| F15B 20/00 | (2006.01) |
| B64D 41/00 | (2006.01) |
| F02C 7/32 | (2006.01) |
| F15B 15/20 | (2006.01) |

(52) U.S. Cl.
CPC .......... *F15B 20/008* (2013.01); *B64D 41/007* (2013.01); *F02C 7/32* (2013.01); *F15B 15/20* (2013.01); *F05D 2220/32* (2013.01)

(58) Field of Classification Search
CPC .......... F15B 20/008; F15B 15/20; F02C 7/32; B64D 41/007
See application file for complete search history.

(56) References Cited

U.S. PATENT DOCUMENTS

| 4,993,781 A * | 2/1991 | Lindahl ................. B60T 13/141 244/111 |
| 7,828,245 B2 * | 11/2010 | Suisse ..................... B64C 13/40 137/625 |
| 9,193,472 B2 * | 11/2015 | Sasscer ................ B64D 41/007 |

* cited by examiner

*Primary Examiner* — Kevin Lee
(74) *Attorney, Agent, or Firm* — Cantor Colburn LLP

(57) ABSTRACT

A ram air turbine control valve includes a sleeve, a spool, and a return housing. The sleeve defines a first exit port disposed proximate a first end of the sleeve and defines a second exit port disposed between the first exit port and the first end. The spool is radially contained within the sleeve and is movable between a first position and a second position. The return housing is coupled to the first end of the sleeve and defines a cavity that receives a biasing member that engages the spool.

16 Claims, 4 Drawing Sheets

RAM AIR TURBINE ACTUATOR SYSTEM

BACKGROUND

The present disclosure relates to a ram air turbine actuator system having a ram air turbine control valve.

Some aircraft are provided with a backup power source that may be air driven. The backup power source is sometimes referred to as a ram air turbine and is movable between a stowed position in which the ram air turbine is received within the aircraft fuselage and a deployed position in which the ram air turbine is disposed outside of the aircraft fuselage. The ram air turbine is deployed and/or retracted by a ram air turbine actuator system.

BRIEF DESCRIPTION

According to an embodiment of the present disclosure, a ram air turbine actuator system is provided. The ram air turbine actuator system includes an actuator assembly and a ram air turbine control valve. The actuator assembly is configured to selectively enable the deployment and retraction of a ram air turbine. The ram air turbine control valve is hydraulically connected to the actuator assembly and includes a sleeve and a spool. The sleeve has a first exit port disposed proximate a first end of the sleeve and has a second exit port disposed between the first exit port and the first end. The spool is radially contained within the sleeve. The spool has a first seal land disposed proximate the first end of the sleeve and had a second seal land disposed proximate a second end of the sleeve.

According to another embodiment of the present disclosure, a ram air turbine control valve is provided. The ram air turbine control valve includes a sleeve, a spool, and a return housing. The sleeve has a body defining an inner bore. The body extends between a first end and a second end and defines a first exit port disposed proximate the first end and defines a second exit port disposed between the first exit port and the first end. The spool is radially contained within the inner bore and is movable between a first position and a second position. The return housing is coupled to the first end of the sleeve and defines a cavity that receives a biasing member that engages the spool and biases the spool towards the first position.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. Various elements of the disclosed embodiments may be combined or omitted to form further embodiments of the invention. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

Figure 1:
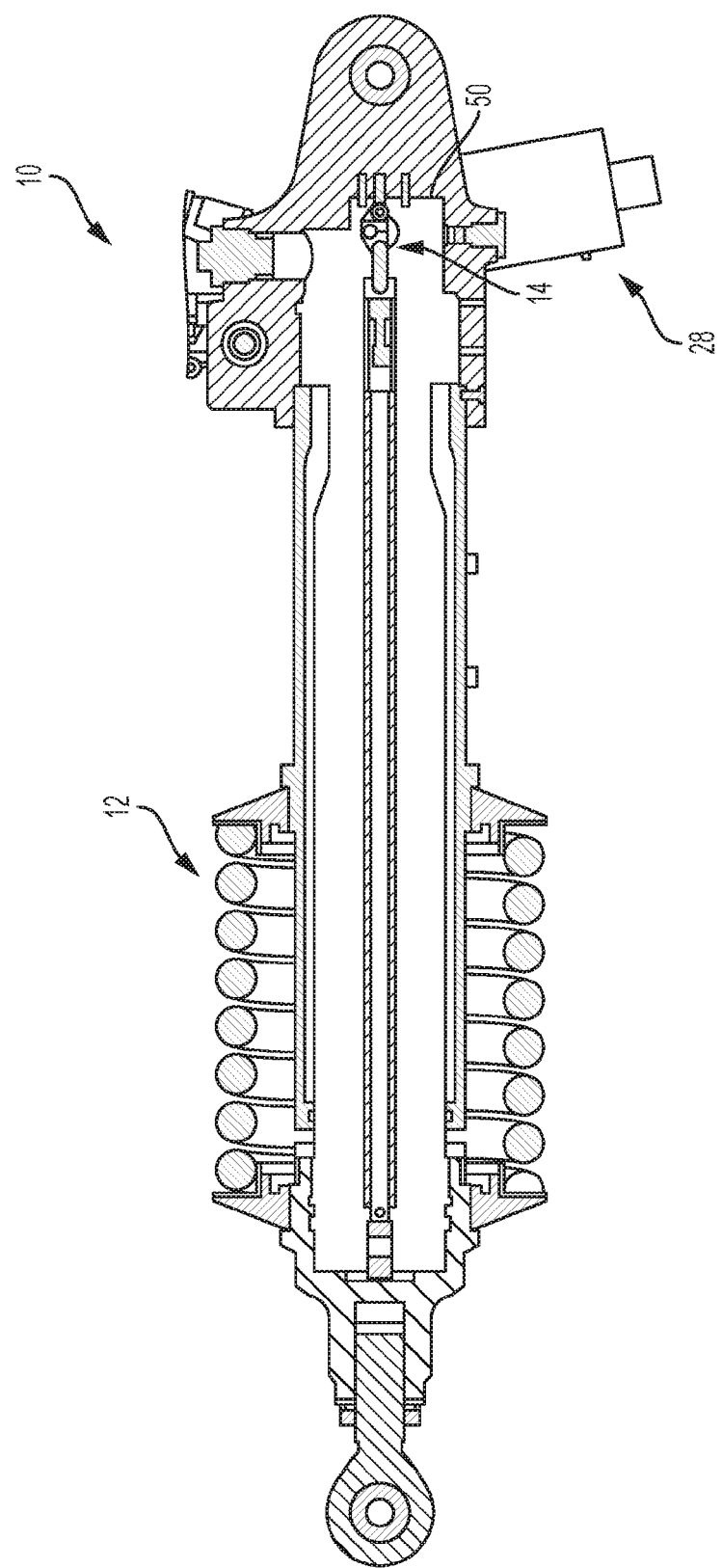
FIG. 1 is a side view of a ram air turbine actuator system.

Referring to FIG. 1, a ram air turbine actuator system 10 is shown. The ram air turbine actuator system 10 is operatively connected to a ram air turbine at a first end and is connected to an aircraft structure at a second end. The ram air turbine is movable between a stowed position and a deployed position by the action of the ram air turbine actuator system 10. The ram air turbine, when in the deployed position interacts with a moving airstream to provide electrical power or hydraulic power to an aircraft. The ram air turbine, when in the stowed position, does not provide power to the aircraft. The ram air turbine actuator system 10 includes an actuator assembly 12, a toggle assembly 14, and a ram air turbine control valve 16 hydraulically or hydraulically connected to the actuator assembly 12.

The actuator assembly 12 is configured to selectively move the ram air turbine between the deployed position and the stowed position. During a stowing event, in which the ram air turbine moves from the deployed position towards the stowed position a hydraulic system 20 provides hydraulic pressure to the ram air turbine control valve 16 and ultimately the actuator assembly 12. The provision of hydraulic pressure to the ram air turbine control valve 16 causes the ram air turbine to begin to and move towards the stowed position within the aircraft. Towards the end of the stowing event, hydraulic pressure is released from the ram air turbine control valve 16, should the release of the hydraulic pressure not be precisely controlled, the toggle assembly 14 may not remain latched, and the ram air turbine may be inadvertently redeployed. The configuration of the ram air turbine control valve 16 is configured to control the rate of hydraulic pressure release to inhibit inadvertent redeployment of the ram air turbine.

Figure 2:
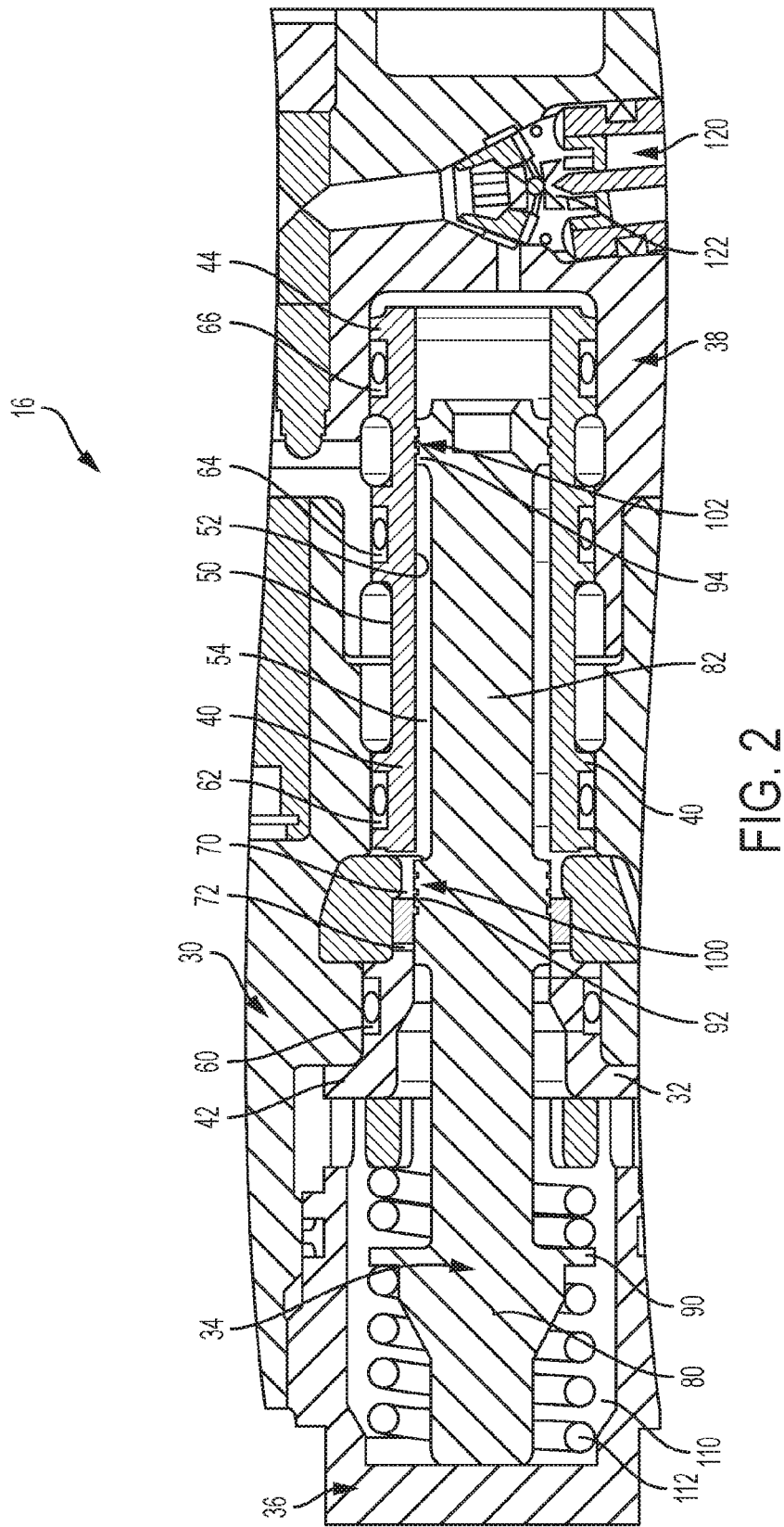
FIG. 2 is a side view of a ram air turbine control valve in a first position.
Figure 3:
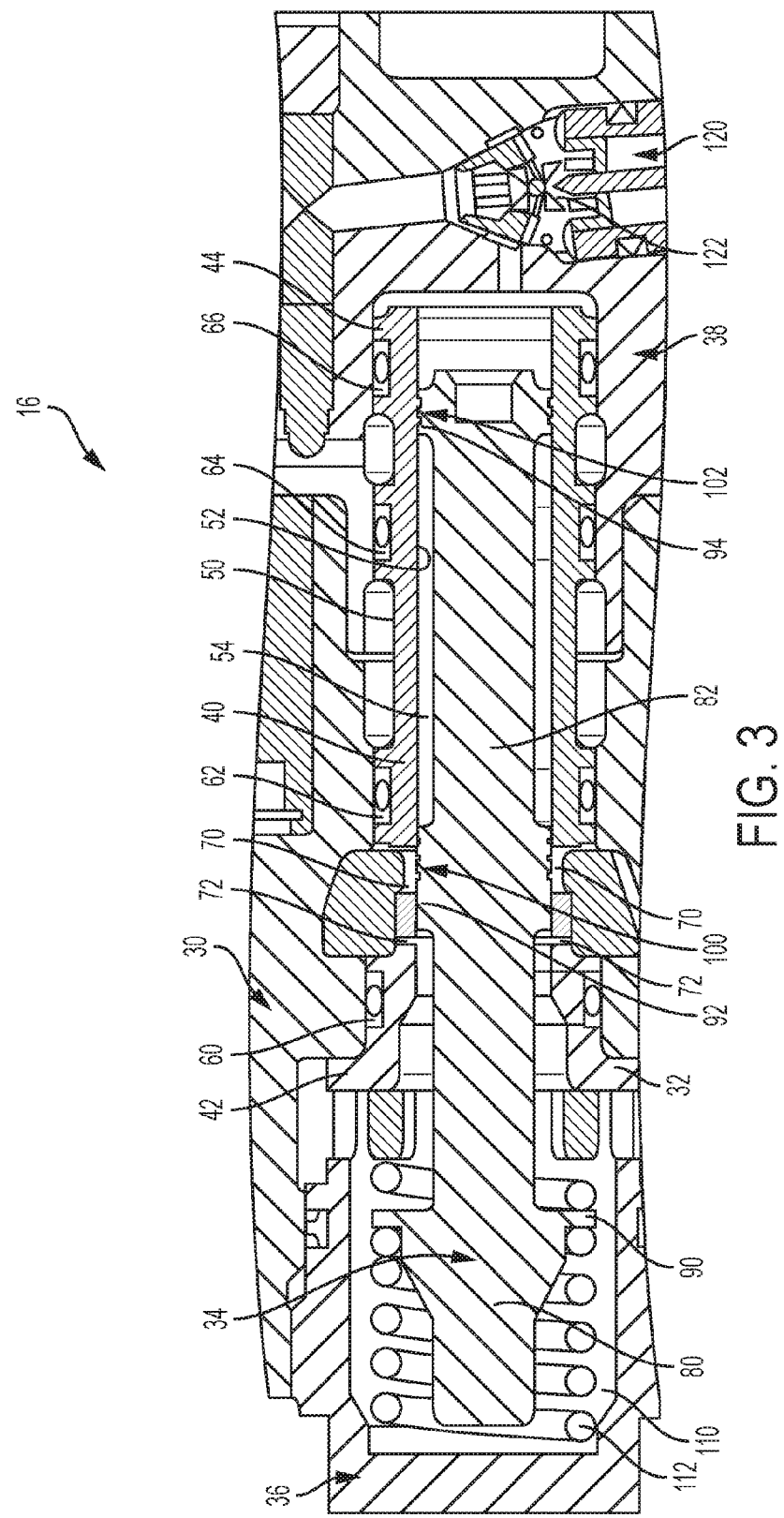
FIG. 3 is a side view of the ram air turbine actuator valve moving towards a second position.
Figure 4:
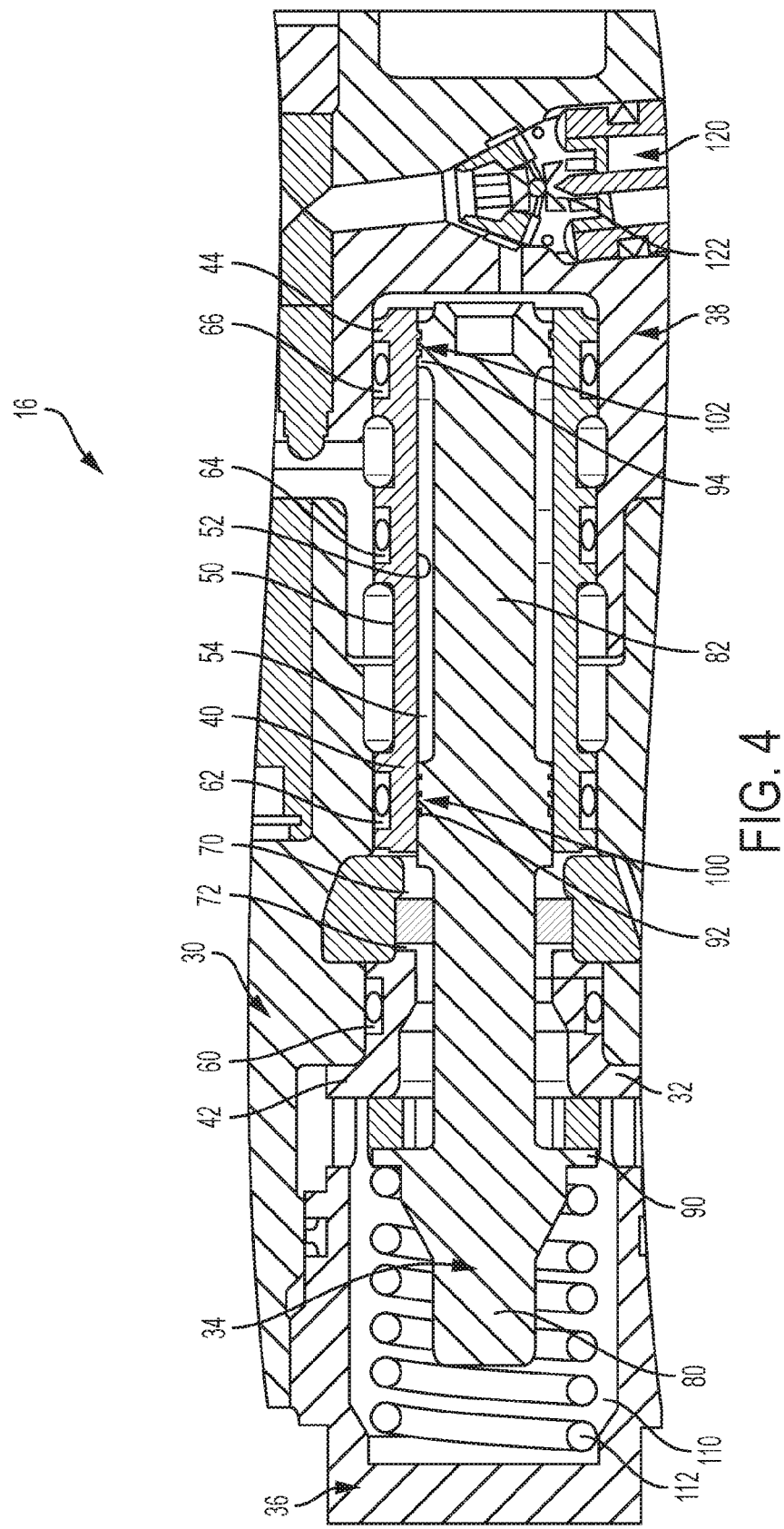
FIG. 4 is a side view of the ram air turbine actuator valve in the second position.

Referring to FIGS. 2-4, the ram air turbine control valve 16 includes an actuator housing 30 that receives a sleeve 32, a spool 34, a return housing 36, and a gland housing 38. The sleeve 32 includes a sleeve body 40 that extends between a first end 42 and a second end 44. The sleeve body 40 includes an exterior surface 50, an interior surface 52 disposed opposite the exterior surface 50, and an inner bore 54 that is defined by the interior surface 52 of the sleeve body 40.

The exterior surface 50 defines a first sealing groove 60, a second sealing groove 62, a third sealing groove 64, and a fourth sealing groove 66. The first sealing groove 60 is disposed proximate the first end 42 of the sleeve body 40. The second sealing groove 62 is disposed between the first sealing groove 60 and the third sealing groove 64. The third sealing groove 64 is disposed between the second sealing groove 62 and the fourth sealing groove 66. The fourth sealing groove 66 is disposed proximate the second end 44 of the sleeve body 40. Each sealing groove is configured to receive a sealing member, such as an O-ring, or the like. Each sealing member is configured to engage an inner surface of the actuator housing 30 and a portion of the exterior surface 50.

The sleeve body 40 defines a first exit port 70 and a second exit port 72. The first exit port 70 and the second exit port 72 are hydraulically connected to the hydraulic system 20 and are configured to provide hydraulic pressure to the interior components of the ram air turbine control valve 16. The first exit port 70 is disposed proximate the first end 42 of the sleeve body 40. The first exit port 70 extends from the exterior surface 50 to the interior surface 52. The first exit port 70 is disposed between the first sealing groove 60 and the second sealing groove 62. The first exit port 70 is disposed closer to the second sealing groove 62 than the first sealing groove 60. The first exit port 70 has a first exit port diameter.

The second exit port 72 is spaced apart from the first exit port 70. The second exit port 72 is disposed between the first exit port 70 and the first end 42 of the sleeve body 40. The second exit port 72 extends from the exterior surface 50 to the interior surface 52. The second exit port 72 is disposed between the first sealing groove 60 and the second sealing groove 62. The second exit port 72 is disposed closer to the first sealing groove 60 than the second sealing groove 62. The second exit port 72 has a second exit port diameter that is less than the first exit port diameter. The first exit port diameter is greater than the second exit port diameter.

The spool 34 is radially contained within the sleeve 32. The spool 34 is received within the inner bore 54 of the sleeve body 40. The spool 34 is movable between a first position (as shown in FIG. 2) that corresponds to a position in which the ram air turbine actuator system 10 is stowing or in an energized position and a second position (as shown in FIG. 4) that corresponds to a dormant position of the ram air turbine actuator system 10 in which the ram air turbine actuator system 10 is stowed, deployed, or deploying. The selective provision of hydraulic pressure from the hydraulic system 20 to the ram air turbine control valve 16 causes the spool 34 to translate between the first position and the second position.

The spool 34 includes a first spool portion 80 and a second spool portion 82. The first spool portion 80 extends through the sleeve 32 and is received within the return housing 36. The first spool portion 80 includes a flange or circumferential rim 90. The circumferential rim 90 has a diameter that is greater than a diameter of the inner bore 54 of the sleeve body 40 of the sleeve 32. The circumferential rim 90 is sized such that an end of the first spool portion 80 does not extend into the inner bore 54 of the sleeve body 40 of the sleeve 32 when the spool 34 is moving towards or is in the second position.

The second spool portion 82 is disposed opposite the first spool portion 80. The second spool portion 82 defines a first seal land 92 and a second seal land 94. The first seal land 92 extends from an exterior surface of the second spool portion 82 towards the interior surface 52 of the sleeve body 40. The first seal land 92 is disposed between a first end of the spool 34 and a second end of the spool 34. The first seal land 92 defines a first plurality of sealing grooves 100. The first plurality of sealing grooves 100 extend about a circumference of the first seal land 92. The first plurality of sealing grooves 100 are configured to aid in establishing a pressure balance between opposite sides of the spool 34.

The second seal land 94 is disposed proximate the second end of the spool 34. The second seal land 94 extends from the exterior surface of the second spool portion 82 towards the interior surface 52 of the sleeve body 40. The second seal land 94 defines a second plurality of sealing grooves 102. The second plurality of sealing grooves 102 extend about a circumference of the second seal land 94. The second plurality of sealing grooves 102 are configured to aid in establishing a pressure balance between opposite sides of the spool 34.

The return housing 36 extends into the actuator housing 30. The return housing 36 is coupled to the first end 42 of the sleeve body 40 of the sleeve 32. The return housing 36 defines a cavity 110 that receives a biasing member 112. The biasing member 112 is configured to engage the circumferential rim 90 of the first spool portion 80 of the spool 34. The biasing member 112 is configured to bias the spool 34 towards the second position.

The gland housing 38 extends into the actuator housing 30. The gland housing 38 is coupled to the second end 44 of the sleeve body 40 of the sleeve 32. The gland housing 38 includes a land 120 having a stow gland assembly 122 that selectively provides hydraulic pressure from the hydraulic system 20 to at least the second end 44 of the sleeve body 40 of the sleeve 32 to move the spool 34 from the second position towards the first position. The stow gland assembly 122 allows for the porting of pressure to shuttle the spool 34.

The hydraulic pressure from the stow gland assembly 122 will reach the ram air turbine control valve 16 through a port 74 disposed between the stow gland assembly 122 and the gland housing 38, proximate the second end 44 of the sleeve body 40. So between 122 and 38 there is a hole. High hydraulic pressure is supplied through the port 74 and the spool 34 is forced into the first position as shown in FIG. 2. The moving of the spool 34 moves the ram air turbine control valve 16 to cause the ram air turbine actuator to stow.

While the spool 34 is in the first position, as shown in FIG. 2, the first seal land 92 blocks the first exit port 70 and the second exit port 72 to inhibit the exiting of hydraulic pressure from the inner bore 54 of the sleeve 32. The stow gland assembly 122 seats to block the delivery of hydraulic pressure to the ram air turbine control valve 16 and opens a ram air turbine control valve return, in response to the initiation of a stowing event of the ram air turbine. When the stow gland assembly 122 closes or ceases the provision of hydraulic pressure through port 74, the hydraulic pressure at the end of the spool 34 proximate the second end 44 of the sleeve body 40 will decrease and will run out through the stow gland assembly 122. The decrease in the hydraulic pressure causes the biasing member 112 to push against the first spool portion 80 to aid in moving the spool 34 from the position shown in FIG. 2 through the position illustrated in FIG. 3 to the position to FIG. 4. As the spool 34 moves towards the second position, as shown in FIG. 3, the first seal land 92 uncovers, exposes, or un-blocks the second exit port 72 to begin releasing hydraulic pressure from the inner bore 54 of the sleeve body 40 of the sleeve 32. The second exit port 72 is exposed prior to the first exit port 70 being exposed. The opening or exposing of the second exit port 72 begins to reduce the hydraulic pressure at a first rate.

As the spool 34 continues to move towards the second position, as shown in FIG. 4, the first seal land 92 uncovers, exposes, or un-blocks the first exit port 70 to further release hydraulic pressure from the inner bore 54 of the sleeve body. The opening or exposing of the first exit port 70 reduces the hydraulic pressure at a second rate that is greater than the first rate. The opening of the second exit port 72 prior to the first exit port 70 reduces an impact velocity of a lock piston that is associated with the toggle assembly 14. The reduction in the impact velocity of the lock piston that is associated with the toggle assembly 14 decreases the lock piston force to ensure that the toggle assembly 14 remains latched, and the ram air turbine remains stowed.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A ram air turbine actuator system, comprising:
   a actuator assembly configured to selectively deploy and retract a ram air turbine; and
   a ram air turbine control valve hydraulically connected to the actuator assembly, the ram air turbine control valve comprising:
      a sleeve having a first exit port disposed proximate a first end of the sleeve and having a second exit port disposed between the first exit port and the first end, and
      a spool radially contained within the sleeve, the spool having a first seal land disposed proximate the first end of the sleeve and having a second seal land disposed proximate a second end of the sleeve.

2. The ram air turbine actuator system of claim 1, wherein the first seal land defines a first plurality of sealing grooves.

3. The ram air turbine actuator system of claim 2, wherein the second seal land defines a second plurality of sealing grooves.

4. The ram air turbine actuator system of claim 2, wherein the ram air turbine control valve further comprising:
   a return housing coupled to the first end of the sleeve, the return housing defining a cavity that receives a biasing member that engages the spool and biases the spool towards a first position that corresponds to a stowed position of the ram air turbine.

5. The ram air turbine actuator system of claim 4, wherein while the spool is in the first position, the first seal land blocks the first exit port and the second exit port.

6. The ram air turbine actuator system of claim 2, wherein the first exit port has a first exit port diameter and the second exit port has a second exit port diameter.

7. The ram air turbine actuator system of claim 6, wherein the first exit port diameter is greater than the second exit port diameter.

8. A ram air turbine control valve, comprising:
   a sleeve having a body defining an inner bore, the body extending between a first end and a second end, the body defining a first exit port disposed proximate the first end and defining a second exit port disposed between the first exit port and the first end;
   a spool radially contained within the inner bore, the spool movable between a first position and a second position; and
   a return housing coupled to the first end on the sleeve, the return housing defining a cavity that receives a biasing member that engages the spool and biases the spool towards the first position.

9. The ram air turbine control valve of claim 8, wherein the first exit port and the second exit port are disposed between a first sealing groove and a second sealing groove defined by the sleeve.

10. The ram air turbine control valve of claim 8, wherein the first exit port has a first exit port diameter and the second exit port has a second exit port diameter.

11. The ram air turbine control valve of claim 10, wherein the second exit port diameter is less than the first exit port diameter.

12. The ram air turbine control valve of claim 8, wherein the spool includes a first spool portion that engages the biasing member and a second spool portion disposed opposite the first spool portion.

13. The ram air turbine control valve of claim 12, wherein the second spool portion defines a first seal land having a first plurality of grooves.

14. The ram air turbine control valve of claim 13, wherein while the spool is in the first position the first seal land blocks the second exit port and the first exit port.

15. The ram air turbine control valve of claim 14, wherein while the spool moves from the first position towards the second position the second exit port is exposed prior to exposing the first exit port.

16. The ram air turbine control valve of claim 15, wherein the second spool portion defines a second seal land having a second plurality of grooves, the second seal land disposed proximate the second end of the sleeve.

* * * * *